May 12, 1931.                J. GARDINER                1,804,683
                           RIVET ROLLING DEVICE
                          Filed March 31, 1930

JOHN GARDINER
        INVENTOR

ATTORNEY

Patented May 12, 1931

1,804,683

UNITED STATES PATENT OFFICE

JOHN GARDINER, OF LOS ANGELES, CALIFORNIA

RIVET ROLLING DEVICE

Application filed March 31, 1930. Serial No. 440,344.

The object of my invention is to provide a safe and convenient tool for use in tightening the heads of leaking rivets.

Rivets often begin to leak while the plates in which they are placed are in such use that it is dangerous or impossible to drive them tight with a hammer. For instance, a boiler or still may develop a leaky rivet in a cramped portion of the setting in which it is impossible to strike an effective blow or, if the rivet is accessible, peening of the head may cause it to snap off or may open up adjacent rivets. Again, rivets around the manholes of tanks holding highly inflammable materials such as gasoline cannot safely be struck with a hammer because of the possibility of causing sparks.

In all such situations my improved device may be used with safety as it tightens the rivet by rolling down its edge, striking no sparks and setting up no vibration. It can also be used in any confined situation in which the distance from the rivet head to the nearest obstruction in line with the rivet is as great as the length of the tool, and in which there is room on one side to swing a ratchet handle.

Figure 1:
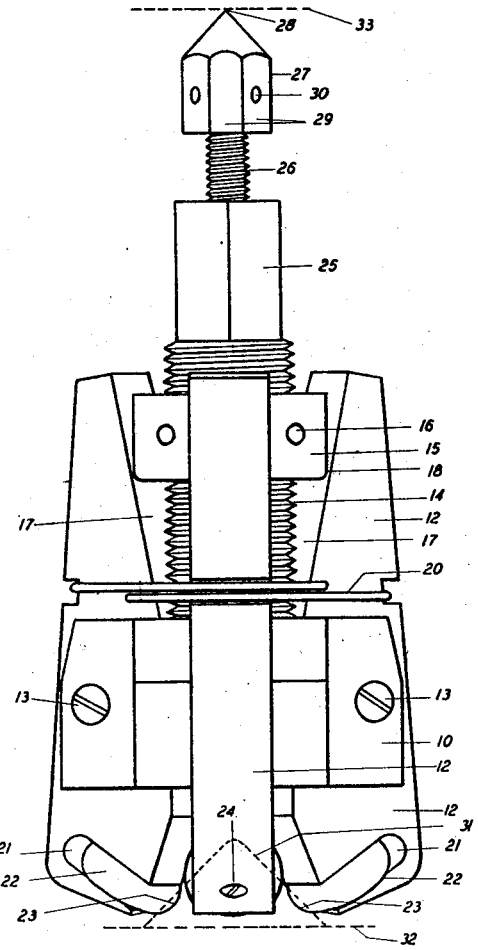
Figure 2:
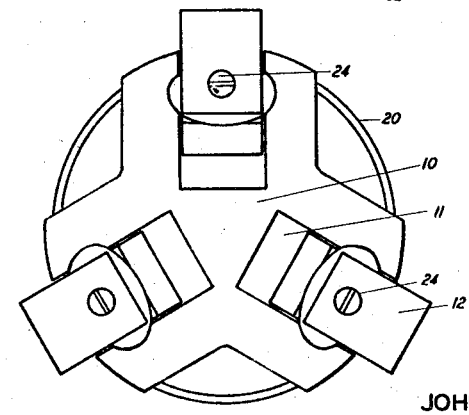

The attached drawings and the following description thereof illustrate a preferred form of my invention, though I do not restrict myself to the exact form shown but only to the structure described in the attached claims. In these drawings Fig. 1 is a side elevation, and Fig. 2 is a bottom plan view of the tool.

Referring to the drawings, 10 is a steel or other metal body in which three or more slots 11—11 are formed. In these slots a corresponding number of roller arms 12—12 are pivotally supported as by the screw pins 13—13.

The central portion of this body is projected upwardly in the form of a heavy stem which is threaded as at 14, this thread engaging a round nut 15 provided with holes 16 for the insertion of a rod for revolving the nut.

The upper inner faces 17 of the arms are sloped away from the stem 14 and as the nut is screwed down its outer surface engages the inner faces of the arms as at 18, thus causing the upper ends of the arms to diverge and the lower ends to correspondingly converge. On backing up the nut the upper ends of the arms are drawn together by the spring 20, which is in tension, and the lower ends of the arms are thus permitted to separate to any desired spacing.

At the bottom of each arm a transverse slot 21 is formed and in this slot is placed a hardened steel roller 22 having an arcuate periphery as at 23. These rollers are held in the slots by hardened steel screw pins 24.

The upper end of the threaded stem 14 is squared as at 25 to receive a wrench, preferably one of the well known types of ratchet wrenches. Within this squared end a long axial hole is drilled and threaded and into this hole is inserted a correspondingly threaded stem 26 having at its upper end a block 27 which is drawn to a point 28 and is adapted, as by the flat faces 29, to be turned by a wrench, or by holes 30 to be turned by means of a rod.

In Fig. 1 a rivet head 31 and the upper face of the plate 32 through which the rivet is inserted are indicated by dotted lines. When a rivet is to be tightened the lower end of the tool is placed over the rivet head with the hardened steel rollers in contact with the lower edge of its conical face. The tool is arranged on the axis of the rivet and supported at its opposite end 28 by means of any suitable blocking or "back-up" arrangement, indicated by the dotted line 33, which may be of the character commonly used in supporting and feeding ratchet drills. By turning the head 27 and holding the body of the tool stationary the tool is forced down onto the rivet head with the inner face of the rollers in contact therewith. The entire tool is then revolved by means of a wrench cooperating with the squared end 25, thus causing the rollers to crease or groove the metal of the rivet head. By feeding in the tool in the customary manner by backing up on the thread 26 it may be very forcibly fed down onto the rivet head until the edge of the head has been swedged into non-leaking contact with the sheet.

I claim as my invention:

1. A rivet tightening tool comprising: a body; vertical slots in said body; a plurality of arms swingingly supported in said slots; hardened steel rollers revolvably supported at the lower end of said arms; means for adjusting the inclination of said arms; means for revolving said body and means for advancing said rollers into contact with a rivet head.

2. A rivet tightening tool comprising: a compound screw stem; a conical nut attached to one end of the inner screw member thereof; a plurality of arms swingingly attached to the opposite end of the outer screw member; a nut on said latter screw member adapted to swing said arms; means for supporting said arms from said screw; rivet head swaging and rolling means on said arms at the end opposite to that having the said conical nut, and spring means adapted to hold said arms constantly in contact with the said nut which is upon the outer screw member.

In witness that I claim the foregoing I have hereunto subscribed my name this 25th day of March, 1930.

JOHN GARDINER.